United States Patent
Quan et al.

(10) Patent No.: US 11,565,957 B2
(45) Date of Patent: Jan. 31, 2023

(54) METHOD FOR PREPARING ELECTRON DONOR BIOFILM CARRIER

(71) Applicant: DALIAN UNIVERSITY OF TECHNOLOGY, Dalian (CN)

(72) Inventors: Xie Quan, Dalian (CN); Yanping Shi, Dalian (CN); Shuo Chen, Dalian (CN); Yaobin Zhang, Dalian (CN); Tao Liu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 424 days.

(21) Appl. No.: 16/611,151

(22) PCT Filed: Feb. 5, 2018

(86) PCT No.: PCT/CN2018/075320
§ 371 (c)(1),
(2) Date: Nov. 5, 2019

(87) PCT Pub. No.: WO2019/148503
PCT Pub. Date: Aug. 8, 2019

(65) Prior Publication Data
US 2020/0071214 A1   Mar. 5, 2020

(51) Int. Cl.
| | |
|---|---|
| C02F 3/28 | (2006.01) |
| B29C 48/00 | (2019.01) |
| B29K 23/00 | (2006.01) |
| B29K 509/00 | (2006.01) |

(52) U.S. Cl.
CPC ........ *C02F 3/2806* (2013.01); *B29C 48/0022* (2019.02); *B29C 2793/009* (2013.01); *B29K 2023/06* (2013.01); *B29K 2023/12* (2013.01); *B29K 2509/00* (2013.01); *C02F 2203/006* (2013.01)

(58) Field of Classification Search
CPC ...... B29C 48/0022; B29C 2948/92209; B29C 2948/92704; B29K 2023/06; B29K 2023/12; Y02W 10/10; C02F 3/104; C02F 3/2806
See application file for complete search history.

(56) References Cited

U.S. PATENT DOCUMENTS 4,083,746 A * 4/1978 Thissen ............... B29C 69/001
156/499
10,196,597 B2 * 2/2019 Assulin ............... C02F 3/108

FOREIGN PATENT DOCUMENTS

| CN | 1522972 A | 8/2004 |
|---|---|---|
| CN | 101284694 A | 10/2008 |
| CN | 103408129 A | 11/2013 |
| CN | 103420490 A | 12/2013 |
| CN | 103708619 A | 4/2014 |
| CN | 103818998 A * | 5/2014 |
| CN | 108178338 A | 6/2018 |
| KR | 10-2017-0033057 A | 3/2017 |

OTHER PUBLICATIONS

English Translation for CN-103818998-A, Dai et al, "a preparation method of biomass micro-organism carrier". (Year: 2014).*

* cited by examiner

*Primary Examiner* — Seyed Masoud Malekzadeh
(74) *Attorney, Agent, or Firm* — Muncy, Geissler, Olds & Lowe, P.C.

(57) ABSTRACT

A method for preparing an electron donor biofilm carrier includes proportioning organic polymer basic raw material and functional modifiers in a range of set-point, mixing the materials, feeding the mixtures into a screw extruder, processing them into a bar-type material, and then cut the bar-type material into granules with the cutting machine, and feeding the granules into the screw extruder, processing them into pipes of various shapes according to the selected screw extruder heads, and then cutting the pipes according to the required size. The electron donor biofilm carrier is mainly used in anaerobic or anoxic suspended carrier biofilm technologies. Electron donors with a standard electrode potential below 100 Mv are used as the functional material for preparation of electron donor biofilm carrier.

4 Claims, No Drawings

METHOD FOR PREPARING ELECTRON DONOR BIOFILM CARRIER

TECHNICAL FIELD

The present disclosure provides an electron donor biofilm carrier (also called biological filler) not only having the advantages of good hydrophilicity and electropositivity, but also having a good performance in low oxygen (including anaerobic, anoxic and simultaneous nitrification and denitrification) suspended carrier biofilm technologies. The electron donor biofilm carrier is used in domestic, agricultural and industrial fields.

BACKGROUND

Currently, as a typical representative of suspended carrier biofilm technologies, aerobic moving bed biofilm reactor (MBBR) and integrated fixed-film activated sludge (IFAS) have been successfully used as the favored biological treatment systems, owing to the improvement on nitrogen removal significantly. However, the application of low oxygen suspended carrier biofilm technologies is relatively limited due to some factors, such as slow anaerobic acclimation and mass transfer efficiency, low attached biomass rate, unstable anaerobic system, unbalanced C/N, difficult control of the operating conditions. In addition, the selection of suspended carrier is also one of key factors for the successful application of these suspended carrier biofilm technologies. Biofilm carriers are the places where microbes attach themselves to biofilm carrier surface and then accumulate quantity gradually through metabolism. Biofilm formation, biomass quantity, and the reactor treatment efficiency are affected by the performance of biofilm carriers directly. Up to now, there are many kinds of biofilm carriers. Dispersed carriers mainly include suspended carriers. The basic raw materials of suspended carrier are generally made up of polyethylene, polystyrene, polyvinyl chloride, polypropylene, vinylon, etc. with a density slightly less than water. These suspended carriers show some innate drawbacks of electronegativity, poor hydrophilicity and bad biocompatibility, which cause the negative influence to the biofilm formation process. Therefore, the present disclosure provides a method for modifying the conventional suspended carrier used in low oxygen suspended carrier biofilm technologies.

The degradation of pollutants in bioreactor is essentially the redox processes occurring in microbes, and it is also a process of electron transfer. As long as the normal operation of the system is not disrupted, the addition of electron donors, electron acceptors or redox mediators that microbes can use is contributed to improve the performance of the related system. In the low oxygen environment, the Oxidation Reduction Potential (ORP) value of the environment surrounding the obligate anaerobes and facultative anaerobes with an aerobic respiration is generally below 100 mV. So the standard electrode potential of the selected electronic donor should below 100 mV. Electron donors are divided into organic and inorganic parts. Organic electronic donors that microbes can use include pyruvate, propionate, acetate, glucose, starch, etc. While inorganic electronic donors include zero-valent aluminum, zero-valent tin, zero-valent zinc, sulfide, etc. The addition of these electron donors would bring many benefits to the bio-reactor. Regulating the pH of the system with these electron donors can construct a suitable survival environment for microbes. They also may enhance and maintain the system in an anaerobic or anoxic environment, promote the electron transfer process. Furthermore, the means is beneficial to promote the bacterial accumulation and the maturation and secretion of enzymes, thus inducing the enrichment of functional biofilm microbes.

Based on the above, the electron donor biofilm carrier was prepared by blending with electron donors. It is likely to show that the electron donor biofilm carrier offers superior performance in the wastewater treatment with low oxygen suspended carrier biofilm technologies.

SUMMARY

The object of the present disclosure is to provide an electron donor biofilm carrier on the basis of overcoming the shortcomings of the preparation method of convention biofilm carriers, which is contributed to improve the efficiency of wastewater treatment with low oxygen suspended carrier biofilm technologies and complete the biofilm formation process quickly. The present disclosure is suitable for manufacturing all kinds of biofilm carriers, including fixed and suspended carriers.

The technical solutions of the present disclosure are as follows:

The electron donor biofilm carrier comprises an organic polymer basic raw material and functional modifiers. Wherein, the organic polymer basic raw material is polyethylene or polypropylene, and the functional modifiers are electron donors that have a standard electrode potential below 100 mV (the ORP value of the environment surrounding the obligate anaerobes and facultative anaerobes with an aerobic respiration is generally below 100 mV in the low oxygen environment), such as glucose, acetate (organic compounds), sulfide (inorganic compounds), zero-valent zinc, zero-valent aluminum (inorganic Metals) and so on. Those electron donors are beneficial to constructing a suitable survival environment for microbes by regulating the pH of the system. They may enhance and maintain the system in an anaerobic or anoxic environment. They also may promote various redox reactions in the system. Furthermore, they may enhance the activity of functional biofilm microbes and induce the enrichment of functional biofilm microbes. The grain sizes of the functional modifiers are more than 200 meshes, and the mass fraction ratio of functional modifiers and organic polymer basic raw material is 0.5-15:100.

The electron donor biofilm carrier comprises excipients, which are polyquaternary ammonium salt-10 (PQAS-10) and talc. The PQAS-10 can improve the eletrophilicity and hydrophilicity of biofilm carrier. The grain size of the PQAS-10 is more than 100 meshes. The talc can enhance the tensile toughness of the organic polymer basic raw material, which makes melt flow or extrusion is easily. The grain size of the talc is more than 200 meshes. The mass fraction ratio of PQAS-10, talc and organic polymer basic raw material is 0.5-6:0.5-4:100.

A preparation method of an electron donor biofilm carrier is as follows.

Step 1. Organic polymer basic raw material, functional modifiers and excipients are proportioned in the range of set-point.

Step 2. Mix the materials of the step 1 fully in a mixing container.

Step 3. Mixtures of the step 2 are fed into the screw extruder and processed into bar-type material, then cut the bar-type material into granules with the cutting machine.

Step 4. Granules of the step 3 are fed into the screw extruder and processed into pipes of various shapes according to the selected screw extruder heads, then cut the pipes according to the required size. In the extrusion process, the setting temperature of each barrel zone of the screw extruder is 120-250° C.

The beneficial effects of the present disclosure are as follows.

1. During the preparation of the electron donor biofilm carrier, basic raw material is blended with some electron donors. So the electron donor biofilm carrier has the function that constructing a suitable survival environment for microbes by regulating the pH of the system. The electron donor biofilm carrier may effectively enhance and maintain an anaerobic or anoxic environment, and it may also promote various redox reactions in the system. Furthermore, the electron donor biofilm carrier may enhance the activity of functional biofilm microbes and induce the enrichment of functional biofilm microbes.

2. During the preparation of the electron donor biofilm carrier, basic raw material is blended with the excipient of electropositive PQAS-10. So the surface of electron donor biofilm carriers has a certain amount of positive charges. Because of electrostatic adsorption, electronegative microbes will move towards the surface of the electron donor biofilm carrier regularly, which reduces the time of biofilm microbes adhere to the surface of the biofilm carrier. Besides, the excipient of PQAS-10 has a property of good hydrophilicity, which leads to the surface of biofilm carrier is hydrophilic and easy to form homologous affinity with the surface of hydrophilic biofilm. The force also reduces the difficulty of the biofilm attachment. Besides, basic raw material is blended with the excipient of talc during the preparation of the electron donor biofilm carrier. The talc has a property of enhancing the tensile toughness of organic polymer basic raw material, which makes melt flow or extrusion is easily.

DETAILED DESCRIPTION

Detailed embodiments of the present invention are described below in conjunction with the technical solutions.

Embodiment 1

200 g extrusion-grade high density polyethylene (HDPE) powder as the basic raw material, 2 g zero-valent zinc as the functional modifier, 4 g PQAS-10 and 2 g talc as the excipients were added in the sealed container in turn. After mix them fully, the mixtures as raw-material 1. The raw-material 1 was fed into the screw extruder and processed into bar-type material. In the extrusion process, the setting temperature of the screw extruder's barrel zone 1, barrel zone 2, barrel zone 3 and head zone were 160° C., 170° C., 180° C. and 160° C. respectively. The bar-type material extruded from the extruder head was cooled with an air cooling system and cut into granules (called raw-material 2) with the cutting machine. The raw-material 2 was fed into the screw extruder and processed into pipes. In the extrusion process, the setting temperature of the screw extruder's barrel zone 1, barrel zone 2, barrel zone 3 and headzone were 135° C., 160° C., 180° C. and 155° C. respectively. The pipes extruded from the extruder head were shaped and sized by a vacuum setting sleeve with vacuum degree of 0.03 MPa and cooled with a water cooling system. At last, the pipes were cut according to the required size. The end product is the electron donor biofilm carrier.

Embodiment 2

200 g extrusion-grade HDPE powder as the basic raw material, 4 g zero-valent zinc as the functional modifier, 4 g PQAS-10 and 2 g talc as the excipients were added in the sealed container in turn. After mix them fully, the mixtures as raw-material 1. The raw-material 1 was fed into the screw extruder and processed into bar-type material. In the extrusion process, the setting temperature of the screw extruder's barrel zone 1, barrel zone 2, barrel zone 3 and headzone were 160° C., 170° C., 180° C. and 160° C. respectively. The bar-type material extruded from the extruder head was cooled with an air cooling system and cut into granules (called raw-material 2) with the cutting machine. The raw-material 2 was fed into the screw extruder and processed into pipes. In the extrusion process, the setting temperature of the screw extruder's barrel zone 1, barrel zone 2, barrel zone 3 and head zone were 135° C., 160° C., 180° C. and 155° C. respectively. The pipes extruded from the extruder head were shaped and sized by a vacuum setting sleeve with vacuum degree of 0.03 MPa and cooled with a water cooling system. At last, the pipes were cut according to the required size. The end product is the electron donor biofilm carrier.

Embodiment 3

200 g extrusion-grade HDPE powder as the basic raw material, 2 g sodium sulfide as the functional modifier, 4 g PQAS-10 and 2 g talc as the excipients were added in the sealed container in turn. After mix them fully, the mixtures as raw-material 1. The raw-material 1 was fed into the screw extruder and processed into bar-type material. In the extrusion process, the setting temperature of the screw extruder's barrel zone 1, barrel zone 2, barrel zone 3 and headzone were 160° C., 170° C., 180° C. and 160° C. respectively. The bar-type material extruded from the extruder head was cooled with an air cooling system and cut into granules (called raw-material 2) with the cutting machine. The raw-material 2 was fed into the screw extruder and processed into pipes. In the extrusion process, the setting temperature of the screw extruder's barrel zone 1, barrel zone 2, barrel zone 3 and head zone were 135° C., 160° C., 180° C. and 155° C. respectively. The pipes extruded from the extruder head were shaped and sized by a vacuum setting sleeve with vacuum degree of 0.03 MPa and cooled with a water cooling system. At last, the pipes were cut according to the required size. The end product is the electron donor biofilm carrier.

Embodiment 4

200 g extrusion-grade HDPE powder as the basic raw material, 4 g pyruvate as the functional modifier, 4 g PQAS-10 and 2 g talc as the excipients were added in the sealed container in turn. After mix them fully, the mixtures as raw-material 1. The raw-material 1 was fed into the screw extruder and processed into bar-type material. In the extrusion process, the setting temperature of the screw extruder's barrel zone 1, barrel zone 2, barrel zone 3 and headzone were 160° C., 170° C., 180° C. and 160° C. respectively. The bar-type material extruded from the extruder head was cooled with an air cooling system and cut into granules (called raw-material 2) with the cutting machine. The raw-material 2 was fed into the screw extruder and processed into pipes. In the extrusion process, the setting temperature of the screw extruder's barrel zone 1, barrel zone 2, barrel zone 3 and head zone were 135° C., 160° C., 180° C. and 155° C. respectively. The pipes extruded from the extruder head were shaped and sized by a vacuum setting sleeve with vacuum degree of 0.03 MPa and cooled with a water cooling system. At last, the pipes were cut according to the required size. The end product was the electron donor biofilm carrier.

The invention claimed is:

1. A method for preparing an electron donor biofilm carrier, the electron donor biofilm carrier comprising an organic polymer basic raw material and functional modifiers, wherein the organic polymer basic raw material is polyethylene or polypropylene, wherein the functional modifiers are electron donors that have an electrode potential below 100 mV, wherein grain sizes of the functional modifiers are more than 200 meshes, and wherein a mass fraction ratio of the functional modifiers and the organic polymer basic raw material is 0.5-15:100, the method comprising:
   proportioning the organic polymer basic raw material and the functional modifiers in a range of set-point;
   mixing the organic polymer basic raw material and the functional modifiers fully in a mixing container to obtain a mixture;
   feeding the mixture into a screw extruder, processing the mixture into a bar, and then cutting the bar into granules with a cutting machine, during said processing the mixture into the bar, a setting temperature of a first barrel zone, a second barrel zone, a third barrel zone and a head zone is 160° C., 170° C., 180° C. and 160° C., respectively; and
   feeding the granules into the screw extruder, processing the granules into pipes of various shapes according to selected screw extruder heads, and then cutting the pipes according to a predetermined size, during said processing the granules into pipes, a setting temperature of a first barrel zone, a second barrel zone, a third barrel zone and a head zone is 135° C., 160° C., 180° C. and 155° C., respectively,
   wherein the pipes extruded from the screw extruder are shaped by a vacuum setting sleeve with a vacuum degree of 0.03 MPa.

2. A method for preparing an electron donor biofilm carrier, the electron donor biofilm carrier comprising an organic polymer basic raw material, functional modifiers and excipients, wherein the organic polymer basic raw material is polyethylene or polypropylene, the functional modifiers are electron donors that have an electrode potential below 100 mV, grain sizes of the functional modifiers are more than 200 meshes, and a mass fraction ratio of the functional modifiers and the organic polymer basic raw material is 0.5-15:100, wherein the excipients are polyquaternary ammonium salt-10 and talc, wherein a grain size of the polyquaternary ammonium salt-10 is more than 100 meshes, wherein a grain size of the talc is more than 200 meshes, wherein a mass fraction ratio of the polyquaternary ammonium salt-10, the talc and the organic polymer basic raw material is 0.5-6:0.5-4:100, the method comprising:
   proportioning the organic polymer basic raw material, the functional modifiers and the excipients in a range of set-point;
   mixing the organic polymer basic raw material, the functional modifiers and the excipients fully in a mixing container to obtain a mixture;
   feeding the mixture into a screw extruder, processing the mixture into a bar, and then cutting the bar into granules with a cutting machine, during said processing the mixture into the bar, a setting temperature of a first barrel zone, a second barrel zone, a third barrel zone and a head zone is 160° C., 170° C., 180° C. and 160° C., respectively; and
   feeding the granules into the screw extruder, processing the granules into pipes of various shapes according to selected screw extruder heads, and then cutting the pipes according to a predetermined size, during said processing the granules into pipes, a setting temperature of a first barrel zone, a second barrel zone, a third barrel zone and a head zone is 135° C., 160° C., 180° C. and 155° C., respectively,
   wherein the pipes extruded from the screw extruder are shaped by a vacuum setting sleeve with a vacuum degree of 0.03 MPa.

3. An electron donor biofilm carrier, comprising:
   an organic polymer basic raw material; and
   functional modifiers,
   wherein the organic polymer basic raw material is polyethylene or polypropylene,
   wherein the functional modifiers are electron donors that have an electrode potential below 100 mV,
   wherein grain sizes of the functional modifiers are more than 200 meshes, and
   wherein a mass fraction ratio of the functional modifiers and the organic polymer basic raw material is 0.5-15:100, the electron donor biofilm carrier being formed by a method comprising:
      proportioning the organic polymer basic raw material and the functional modifiers in a range of set-point;
      mixing the organic polymer basic raw material and the functional modifiers fully in a mixing container to obtain a mixture;
      feeding the mixture into a screw extruder, processing the mixture into a bar, and then cutting the bar into granules with a cutting machine, during said processing the mixture into the bar, a setting temperature of a first barrel zone, a second barrel zone, a third barrel zone and a head zone is 160° C., 170° C., 180° C. and 160° C., respectively; and
      feeding the granules into the screw extruder, processing the granules into pipes of various shapes according to selected screw extruder heads, and then cutting the pipes according to a predetermined size, during said processing the granules into pipes, a setting temperature of a first barrel zone, a second barrel zone, a third barrel zone and a head zone is 135° C., 160° C., 180° C. and 155° C., respectively,
      wherein the pipes extruded from the screw extruder are shaped by a vacuum setting sleeve with a vacuum degree of 0.03 MPa.

4. The electron donor biofilm carrier according to claim 3, wherein the electron donor biofilm carrier further comprises excipients,
   wherein the excipients are polyquaternary ammonium salt-10 and talc,
   wherein a grain size of the polyquaternary ammonium salt-10 is more than 100 meshes, and
   wherein a grain size of the talc is more than 200 meshes;
      a mass fraction ratio of the polyquaternary ammonium salt-10, the talc and the organic polymer basic raw material is 0.5-6:0.5-4:100.

* * * * *